(12) United States Patent
Choi (10) Patent No.: US 7,295,972 B2
(45) Date of Patent: Nov. 13, 2007

(54) METHOD AND APPARATUS FOR BLIND SOURCE SEPARATION USING TWO SENSORS

(75) Inventor: Chang-kyu Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 766 days.

(21) Appl. No.: 10/813,671

(22) Filed: Mar. 31, 2004

(65) Prior Publication Data

US 2004/0230428 A1      Nov. 18, 2004

(30) Foreign Application Priority Data

Mar. 31, 2003      (KR) ...................... 10-2003-0020059

(51) Int. Cl.
*G10L 19/00* (2006.01)
(52) U.S. Cl. ...................................... 704/226
(58) Field of Classification Search ................. 704/226
See application file for complete search history.

(56) References Cited

U.S. PATENT DOCUMENTS 6,553,060 B2 *   4/2003   Souissi et al. .............. 375/219

* cited by examiner

*Primary Examiner*—Susan McFadden
(74) *Attorney, Agent, or Firm*—Staas & Halsey LLP (57) ABSTRACT

A method and apparatus to separate first and second mixture signals received from two sensors and transformed into the frequency domain in two or more source signals. The signal separation method includes: calculating a global signal absence probability for each frame and a local signal absence probability for each frequency band of a corresponding frame for at least one of the first and second mixture signals; estimating a spectrum vector for each frequency band in which a noise signal is eliminated using the global signal absence probability; determining a plurality of frequency bands including at least one of a noise signal and a source signal using the local signal absence probability, and generating a source label vector which consists of a plurality of frequency bands assigned to each source, using an attenuation parameter and a delay parameter generated for each of the determined frequency bands; and multiplying the spectrum vector estimated for each frequency band by the source label vector, and obtaining signals separated according to the source signals.

28 Claims, 8 Drawing Sheets

METHOD AND APPARATUS FOR BLIND SOURCE SEPARATION USING TWO SENSORS

CROSS-REFERENCE TO RELATED APPLICATION

This application claims the priority of Korean Patent Application No. 2003-20059, filed on Mar. 31, 2003, in the Korean Intellectual Property Office, the disclosure of which is incorporated herein in its entirety by reference.

BACKGROUND OF THE INVENTION

1. Field of the Invention

The present invention relates to blind source separation, and more particularly, to a method of and apparatus for separating mixture signals received through two microphones into N source signals while eliminating noise from the received signals in real time.

2. Description of the Related Art

Recently, mobile robots have become of particular interest in areas such as health, security, home networking, and entertainment. To operate a mobile robot, human-robot interaction is required. That is, the mobile robot must be able to assess its surroundings using a vision system, detect the presence of humans and possible obstacles, and understand commands given by an operator.

As such, the mobile robot indispensably requires a sound input system for human-robot interaction and autonomous traveling. Important issues affecting the performance of the sound input system of the mobile robot are factors such as noises, reverberations, and distances to an operator in an indoor environment. In an indoor environment, reverberations exist due to various noise sources, walls, or other objects. Low frequency components of a sound are attenuated more than high frequency components of the sound. The sound input system required for human-robot interaction in an indoor environment must be constructed so that the autonomous traveling mobile robot can receive the operator's voice command from a distance of several meters away and use the received voice command directly for sound recognition including speech recognition.

Generally, the sound input system uses a microphone array consisting of at least two microphones in order to improve the quality of sound and a sound recognition rate including a speech recognition rate. Also, the sound input system eliminates noise components included in sound signals received from the microphone array, using methods such as a single channel speech enhancement method, an adaptive acoustic noise canceling method, a generalized sidelobe canceling method, or a blind signal separation algorithm.

The single channel speech enhancement method uses one microphone and can be applied only to a case where a statistical property of noise is not time dependent, for example, stationary background noise. An acoustic noise elimination technique disclosed in the paper "Adaptive Noise Canceling: Principles and Applications," by B. Widrow et al., Proceedings of IEEE, vol. 63, no.12, pp. 1692-1716, 1975, uses two microphones. One of the two microphones is a reference microphone to receive only specified noise. However, when the reference microphone receives other noise rather than only the predetermine noise, the noise elimination performance is greatly deteriorated. A generalized sidelobe canceling method disclosed in the paper "A Robust Adaptive Beamformer For Microphone Arrays With A Blocking Matrix Using Constrained Adaptive Filters," by O. Hoshuyama et al., in IEEE Trans. Signal Processing, vol. 47, no. 10, pp. 2677-2684, 1999, is disadvantageous in that a voice activity detector is required and source signals as well as noise signals are eliminated.

Meanwhile, conventional techniques related to the Degenerate Unmixing Estimation Technique (DUET) as a type of blind signal separation algorithm include "Blind Separation of Disjoint Orthogonal Signals: Demixing n Sources from 2 Mixtures," by A. Jourjine, S. Rickard, and O. Yilmaz, in Proc. Int. Conf. on Acoust., Speech, Signal Processing, 2000. vol 5, pp. 2985-2988, "Real-time Time-Frequency based Blind Source Separation," by S. Rickard, R. Balan, and J. Rosca, in Proc. Int. Conf. on Independent Component Analysis and Blind Signal Separation, 2001, pp. 651-656, and "On the Approximate w-Disjoint Orthogonality of Speech," by S. Richard and O. Yilmaz, in Proc. ICASSP 2002, pp. 529-532. Such conventional techniques have been developed on the basis of the w-disjoint orthogonality by which the frequency components of two sound signals $s_1(t)$ and $s_2(t)$ do not overlapped with each other, that is, at most one sound signal component occupies one frequency band. However, when noise is mixed with a mixture signal and the w-disjoint orthogonality is not satisfied, that is, when white Gaussian noise with spectra over an entire frequency band or fan noise generated by a fan motor with spectra over a relatively wide frequency band is mixed with the mixture signal (sound signal), a signal separation performance is greatly deteriorated.

BRIEF SUMMARY

The present invention provides a method of separating mixture signals received through two microphones into N source signals while eliminating noise from the received signals in real time.

The present invention also provides an apparatus for implementing the method.

According to an aspect of the present invention, there is provided a method of separating first and second mixture signals received through two sensors into source signals, including: (a) calculating a global signal absence probability for each frame of the mixture signal and a local signal absence probability for each frequency band of a frame for at least one of the first and second mixture signals; (b) estimating a spectrum vector for each frequency band in which a noise signal is eliminated using the global signal absence probability calculated in the calculating; (c) determining a plurality of frequency bands including at least one of a noise signal and a source signal using the local signal absence probability, and generating a source label vector which consists of a plurality of frequency bands assigned to each source, using an attenuation parameter and a delay parameter generated for each of the determined frequency bands; and (d) multiplying the spectrum vector estimated for each frequency band obtained in the estimating by the source label vector obtained in the determining, and obtaining signals separated according to the source signals.

According to another aspect of the present invention, there is provided an apparatus for separating first and second mixture signals received through two sensors into source signals, includng: a signal absence probability calculator, which calculates a global signal absence probability for each frame of the mixture signals and a local signal absence probability for each frequency band of a frame for at least one of the first and second mixture signals; a signal estimation unit, which estimates a spectrum vector in which a noise signal is eliminated for each frequency band using the global signal absence probability calculated by the signal absence probability calculator; a source signal identification unit, which determines a plurality of frequency bands including at least one of a noise signal and a source signal using the local signal absence probability calculated by the signal absence probability calculator, and generates a source label vector which consists of a plurality of frequency bands assigned to each source signal, using an attenuation parameter and a delay parameter generated for each of the determined frequency bands; and a signal separator, which multiplies the spectrum vector estimated for each frequency band generated by the signal estimation unit by the source label vector obtained for each source signal by the source identification unit, and obtains signals separated according to the source signal.

According to still another aspect of the present invention, there is provided a method of separating first and second mixture signals received through two sensors into source signals, including: (a) calculating a global signal absence probability for each frame of the mixture signals and a local signal absence probability for each frequency band of the frame for at least one of the first and second mixture signals; (b) estimating a spectrum vector in which a noise signal is eliminated for each frequency band using the global signal absence probability calculated in the calculating, and generating first and second mixture signals without noise signals; (c) performing clustering using the first and second mixture signals without noise, and generating a source label vector consisting of a source and a frequency band assigned to each source; and (d) multiplying the source label vector obtained by the source identifying by the spectrum vector obtained by the estimating for each frequency band of the frame, and performing an inverse Fourier transform to separate the received signals into source signals of time domain.

According to yet another aspect of the present invention, there is provided a method of separating first and second mixture signals received through two microphones into source signals while eliminating noise from the received mixture signals, including: (a) calculating a global signal absence probability for each frame of the mixture signals and a local signal absence probability for each frequency band of a frame for at least one of the first and second mixture signals; (b) estimating a spectrum vector in which a noise signal is eliminated for each frequency band using the global signal absence probability calculated in the calculating; (c) determining a plurality of frequency bands including at least one of a noise signal and a source signal using the local signal absence probability, and generating a source label vector which consists of a plurality of frequency bands assigned to each source, using an attenuation parameter and a delay parameter generated for each of the determined frequency bands; and (d) multiplying the spectrum vector estimated for each frequency band obtained in the estimating by the source label vector obtained in the determining, and obtaining signals separated according to the source signals.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Prior to describing a signal separation method and apparatus according to embodiments of the present invention, principles employed in the present invention will be described.

In an environment characterized by small reverberations, the relationship between source signals $s_j(t)$ and microphone observations $x_i(t)$ (here, i=1, 2) can be expressed by equations 1 and 2.

$$x_1(t) = \sum_{j=1}^{N} s_j(t) + n_1(t) \quad (1)$$

$$x_2(t) = \sum_{j=1}^{N} a_j s_j(t - d_j) + n_2(t) \quad (2)$$

Referring to equations 1 and 2, $n_1(t)$ is a noise component which is added to a first microphone observation $x_1(t)$ from a background source, $n_2(t)$ is a noise component which is added to a second microphone observation $x_2(t)$ due to another propagating channel, $a_j$ is a relative attenuation parameter, and $d_j$ is a relative delay parameter between microphones due to the arrival direction.

Such time-domain signals $x_1(t)$ and $x_2(t)$ are subjected to a Fourier transform, for example, a Short-Time Fourier Transform to be transformed into frequency-domain signals. In the frequency domain, assuming that the first microphone observation X(m) is a sum of a source signal S(m) and added noise N(m), a statistical model employing global hypothesis, $H_0$ and $H_1$, which indicate source signal absence and presence at an m-th frame, respectively, is expressed by the following equation 3.

$H_0 : X(m) = N(m)$ $H_1 : X(m) = S(m) + N(m)$ (3)

The source signal S(m) in $H_1$ is a sum of all the individual source signals and is expressed by equation 4.

$$S(m) = \sum_{j=1}^{N} S_j(m) \quad (4)$$

Moreover, since source signal absence and presence arise in each frequency bin, a statistical model employing local hypothesis $H_{0,k}$ and $H_{1,k}$ for each frequency bin, which indicate source signal absence and presence at k-th frequency bin of the m-th frame, respectively, is expressed by the following equation 5.

$$H_{0,k}: X_k(m) = N_k(m)$$
$$H_{1,k}: X_k(m) = S_k(m) + N_k(m) \quad (5)$$

The source signal $S_k(m)$ in $H_{1,k}$ is a sum of all the individual source signal components and is expressed by equation 6.

$$S_k(m) = \sum_{j=1}^{N} S_k^{(j)}(m) \quad (6)$$

Here, $S_k^{(j)}(m)$ represents the j-th source signal component at the k-th frequency bin, that is, the k-th frequency band of the m-th frame. Assuming that the w-disjoint orthogonality is satisfied, at most one source of N sources will dominantly occupy one frequency bin. Therefore, $S_k(m) = S_k^{(j)}(m)$ for an arbitrary j. The w-disjoint orthogonality is disclosed in detail in the paper "On the Approximate w-Disjoint Orthogonality of Speech," by S. Rickard and O. Yilmaz, in Proc. Int. Conf. on Acoust., Speech, Signal Processing, 2002, vol.1, pp. 529-532, the disclosure of which is incorporated by reference. Also, it is assumed that $X_k(m)$ and $N_k(m)$ have zero-mean complex Gaussian densities.

On the basis of the above-described principles, embodiments of the present invention will be described.

Figure 1:
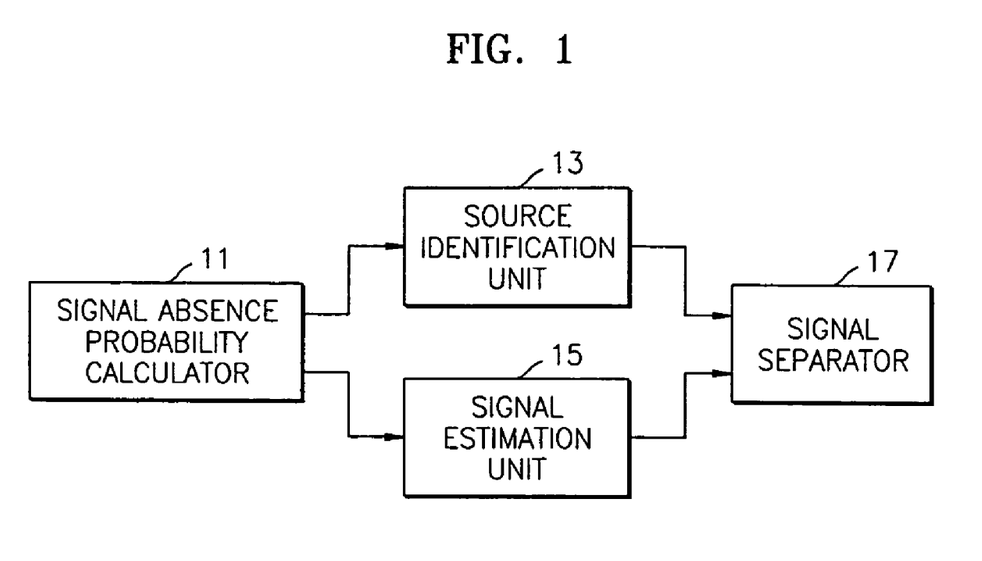
FIG. 1 is a block diagram of a signal separation apparatus according to a first embodiment of the present invention.

FIG. 1 is a block diagram of a signal separation apparatus according to a first embodiment of the present invention. The signal separation apparatus comprises a signal absence probability calculator 11, a source identification unit 13, a signal estimation unit 15, and a source signal separator 17. The signal separation apparatus separates N independent sources from M microphone observations, where $M \leq N$. Hereinafter, for convenience of description, an exemplary case when M=2 will be described.

Figure 2:
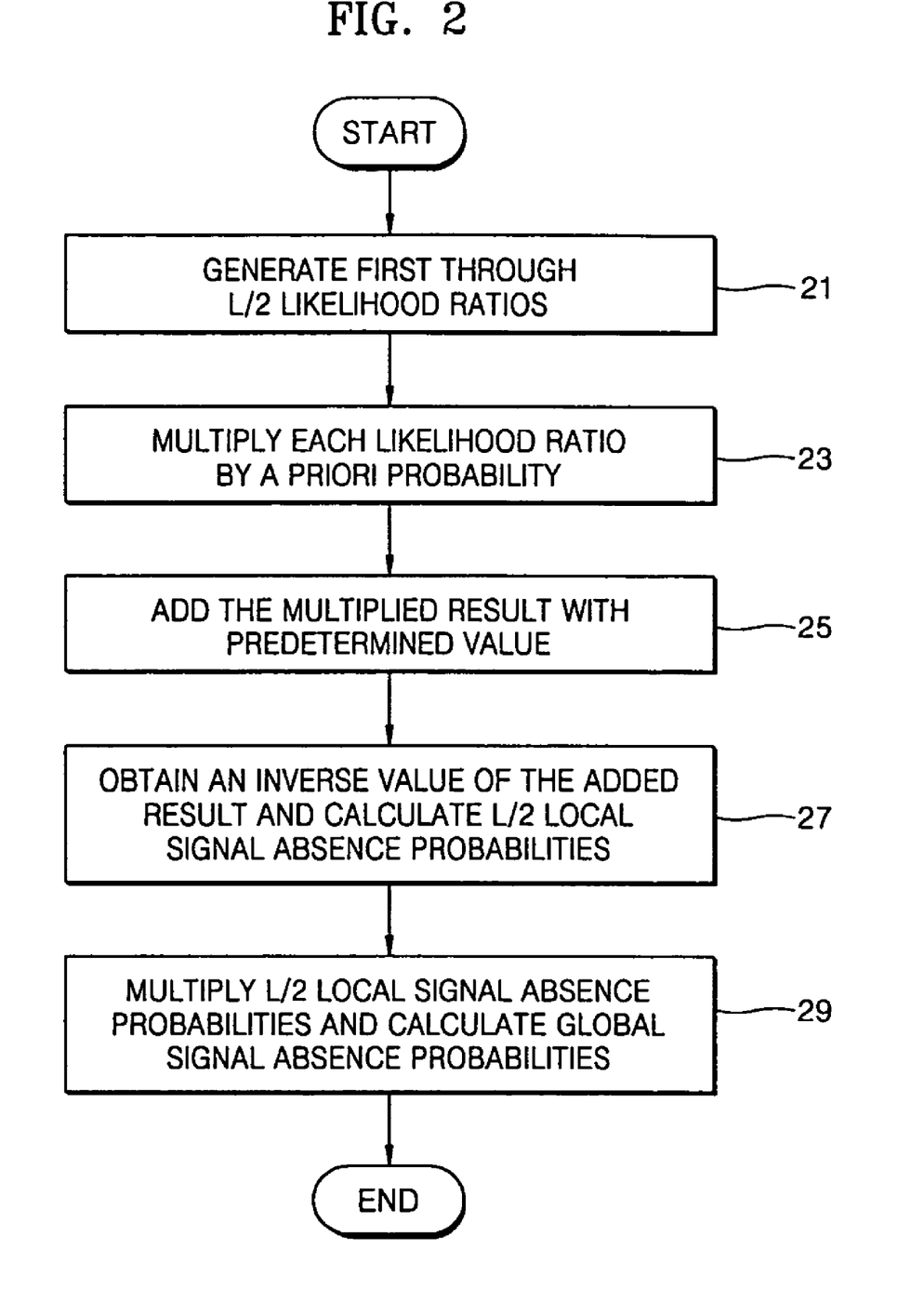
FIG. 2 is a flowchart illustrating the operation of a signal absence probability calculator of FIG. 1.

Referring to FIG. 1, the signal absence probability calculator 11 calculates a global signal absence probability $p(H_0|X(m))$ and a local signal absence probability $p(H_{0,k}|X_k(m))$ for each of the frequency bins of an m-th frame, for one of the first and second microphone observations which are received through two sensors, for example, two microphones, and are transformed into frequency-domain signals. Referring to FIG. 2, this calculation is described in more detail as follows.

$\Lambda k(m)$ (where k=1, ..., L/2) represents the likelihood ratio computed for a k-th frequency bin of the m-th frame is calculated using equation 7. L represents the number of points in Fourier transform.

$$\Lambda_k(m) = \frac{p(X_k(m)|H_{1,k})}{p(X_k(m)|H_{0,k})}$$

where, $$p(X_k(m)|H_{1,k}) = \frac{1}{\pi(\sigma_{S_k}^2(m) + \sigma_{N_k}^2(m))} \exp\left[-\frac{|X_k(m)|^2}{(\sigma_{S_k}^2(m) + \sigma_{N_k}^2(m))}\right] \quad (7)$$

$$p(X_k(m)|H_{0,k}) = \frac{1}{\pi\sigma_{N_k}^2(m)} \exp\left[-\frac{|X_k(m)|^2}{\sigma_{N_k}^2(m)}\right]$$

Here, $p(X_k(m)|H_{1,k})$ is a probability value of the k-th frequency bin of the m-th frame according to local signal presence hypothesis $H_{1,k}$, and $p(X_k(m)|H_{0,k})$ is a probability value of the k-th frequency bin of the m-th frame according to local signal absence hypothesis $H_{0,k}$, wherein $p(X_k(m)|H_{1,k})$ and $p(X_k(m)|H_{0,k})$ can be calculated using a source signal power $\sigma_{S_k}^2$ and a noise signal power $\sigma_N^2$, respectively.

Next, the likelihood ratios are multiplied by a specified a priori probability $q_k$ expressed by equation 8, respectively.

$$q_k = \frac{p(H_{1,k})}{p(H_{0,k})} \quad (8)$$

Here, p(H1,k) is a probability that noise and source signals will coexist at the k-th frequency bin and p(H0,k) is a probability that only noise will exist at the k-th frequency bin.

Next, a specified value, for example, '1', is respectively added to the multiplied results.

Then, local signal absence probabilities $p(H_0,k|X_k(m))$ for the L/2 frequency bins of the m-th frame are calculated as the reciprocals of the added results calculated, as in equation 9.

$$p(H_{0,k}|X_k(m)) = \frac{1}{1 + q_k \Lambda_k(m)} \quad (9)$$

Next, by multiplying all the individual values of the L/2 local signal absence probabilities $p(H_{0,k}|X_k(m))$ using equation 10, a global signal absence probability $p(H_0|X(m))$ at the m-th frame is calculated.

$$p(H_0|X(m)) = \frac{p(H_0, X(m))}{p(X(m))} \quad (10)$$
$$= \frac{1}{\prod_{k=1}^{M}[1 + q_k \Lambda_k(m)]}$$

The above equation 10 can be derived using the following equations 11 and 12.

$$p(H_0|X(m)) = \prod_{k=1}^{M}[p(X_k(m)|H_{0,k})p(H_{0,k})] \quad (11)$$

-continued $$p(X(m)) = \prod_{k=1}^{M} p(X_k(m)) \quad (12)$$

$$= \prod_{k=1}^{M} [p(X_k(m) \mid H_{0,k})p(H_{0,k}) + p(X_k(m) \mid H_{1,k})p(H_{1,k})]$$

Here, since short-time Fourier transform coefficients are not correlated, it is assumed that the spectral component in each of frequency bins, that is, $X_k(m)$, is statistically independent.

Figure 3:
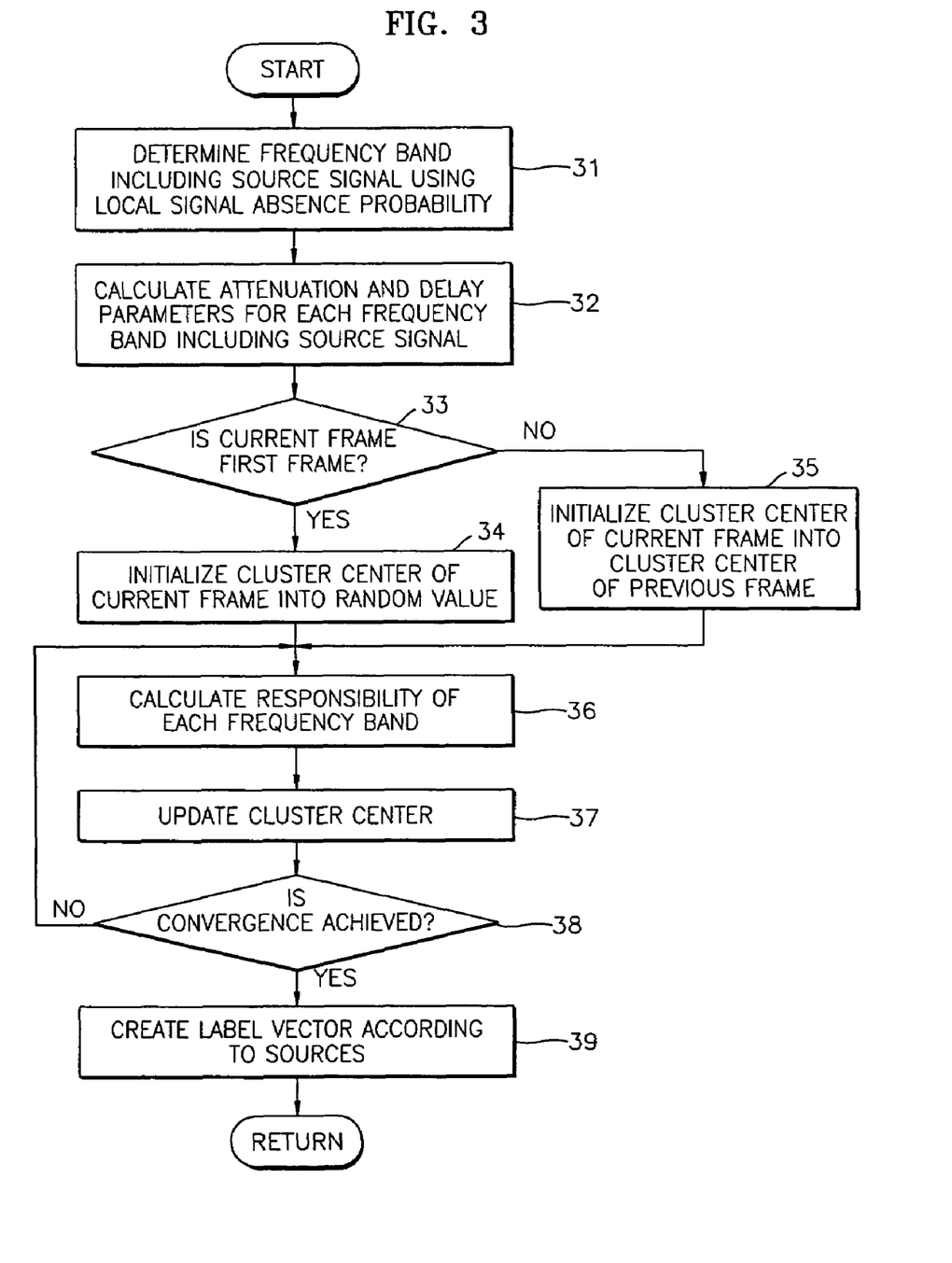
FIG. 3 is a flowchart for describing an operation of a source identification unit of FIG. 1.

Returning to FIG. 1, the source identification unit 13 receives the local signal absence probabilities for respective frames of the first or second microphone observations, which are calculated by the signal absence probability calculator 11, compares the local signal absence probabilities with a predefined first threshold value, and determines whether a source signal exists at a corresponding frequency bin of each frame, that is, a corresponding frequency band, according to the compared result. Thereafter, the source identification unit 13 generates attenuation and delay parameters for the signal value of the frequency band at which it is determined that a source signal exists. The source identification unit 13 recognizes the number of sources and identifies respective frequency bands assigned to respective sources through mixing parameters consisting of the attenuation and delay parameters. The source identification unit 13 performs the above-described source identification process for each frame. Referring to FIG. 3, this operation will be described in more detail as follows.

Referring to FIG. 3, the local signal absence probability of the m-th frame is compared with the first threshold value and a frequency band in which a source signal exists is identified. That is, assuming that a source satisfies the w-disjoint orthogonality, only one source signal component among N sources exists at the k-th frequency band. Accordingly, by comparing the local signal absence probability calculated by equation 9 with the first threshold value, it can be determined which frequency band includes the source signal. For example, if the local signal absence probability exceeds the first threshold value, it is determined that no source signal exists at the corresponding frequency band. If the local signal absence probability does not exceed the first threshold value, it is determined that a source signal exists at the corresponding frequency band. The frequency band in which the source signal exists satisfies the following equation 13 for an arbitrary source j.

$$\begin{bmatrix} X_{1,k}(m) \\ X_{2,k}(m) \end{bmatrix} \approx \begin{bmatrix} 1 \\ a_j e^{-i\omega d_j} \end{bmatrix} S_k^{(j)}(m) \quad (13)$$

Here, $\omega=2\pi k/L$ and L is the number of Fourier transform points.

Next, the attenuation and delay parameters at each of the frequency bands including the source signals can be computed by analyzing a ratio of $X_{1,k}(m)$, and $X_{2,k}(m)$. A mixing parameter $\mu^{(k)}$ consisting of the attenuation and delay parameters can be expressed by equation 14.

$$\mu^{(k)} = (a(k,m), d(k,m)) \quad (14)$$

$$= \left( \left| \frac{X_{2,k}(m)}{X_{1,k}(m)} \right|, -\frac{1}{\omega} \angle \frac{X_{2,k}(m)}{X_{1,k}(m)} \right)$$

Therefore, the frequency bands in which the source signals exist in the m-th frame, for example, P mixing parameters can be obtained using equation 14.

To cluster the P mixing parameters using a soft K-means clustering algorithm, it is determined whether the present frame is a first frame. When the present fame is the first frame, the respective centers $\mu_j$ (where j=1, . . . , K) of K clusters are initialized to random values. When the present frame is not the first frame, the respective centers of the K clusters, i.e., respective average values of mixing parameters which belong to the respective clusters, are initialized into the respective cluster centers of the previous frame. Meanwhile, the number K of clusters is set to 2 through N, and then a specified clustering algorithm is performed. For each of the K values, R values proposed in definition 5 in the paper "A Cluster Separation Measure," by David L. Davies and Donald W. Bouldin, IEEE Transactions on Pattern Analysis and Machine Intelligence, vol. PAMI-1, no.2, April 1979, are calculated, the disclosure of which is incorporated by reference. K with a smallest R value corresponds to the number of actually existing clusters.

Next, 'responsibility' $r_j^{(k)}$ is calculated. The responsibility $r_j^{(k)}$, that is, the probability with which the k-th frequency band belongs to the j-th cluster (where j=1, . . . , K), is clustered using mixing parameters $\mu^{(k)}$ (where k=1 through P) and cluster centers $\mu_j$ (where j=1, . . . , K), as in equation 15. The k-th frequency band is assigned to a cluster having the greatest responsibility.

$$r_j^{(k)} = \frac{\exp(-\beta d(\mu_j, \mu^{(k)}))}{\sum \exp(-\beta d(\mu_j, \mu^{(k)}))} \quad (15)$$

Here, $d(\mu_j,\mu^{(k)})$ is a distance operator between the center of the cluster and the mixing parameter and $\beta$ is a decaying parameter which is inversely proportional to the noise variance.

When each of frequency bands is assigned to one of K clusters according to the responsibilities calculated by equation 15, the center $\mu_j$ of each cluster j is updated according to equation 16.

$$\mu_j = \frac{\sum_k r_j^{(k)} \mu^{(k)}}{\sum_k r_j^{(k)}} \equiv (a_j(m), d_j(m)) \quad (16)$$

Here, $a_j(m)$ and $d_j(m)$ represent the attenuation and delay parameters of the j-th source at the m-th frame, respectively.

Next, it is determined whether the processed algorithm converges. The responsibility calculation and the cluster center updating are performed for a specified iteration number or until the responsibilities do not change anymore. When it is determined that the algorithm does not converge, the process returns to perform responsibility calculation and cluster center updating using the center of cluster updated by equation 16.

When it is determined that the algorithm converges, the number of the clusters is considered as the number of sources and a source label vector for each of sources is generated.

Figure 4A:
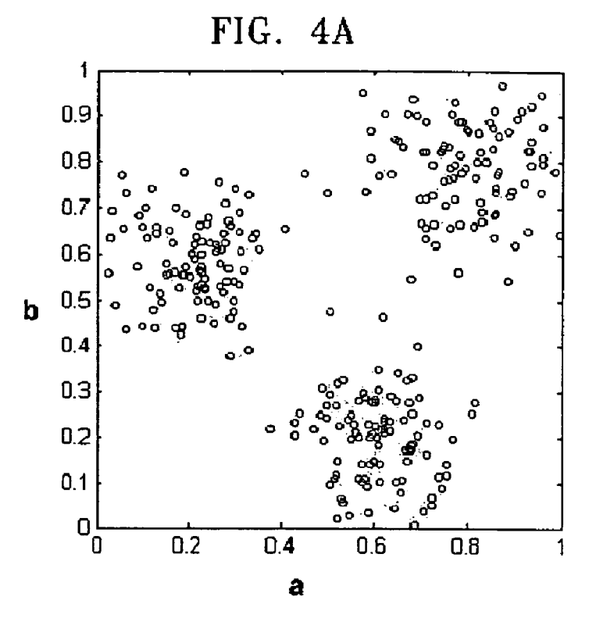
FIGS. 4a and 4b are graphs respectively showing 2-D and 3-D results of clusters obtained by the source identification unit of FIG. 3.
Figure 4B:
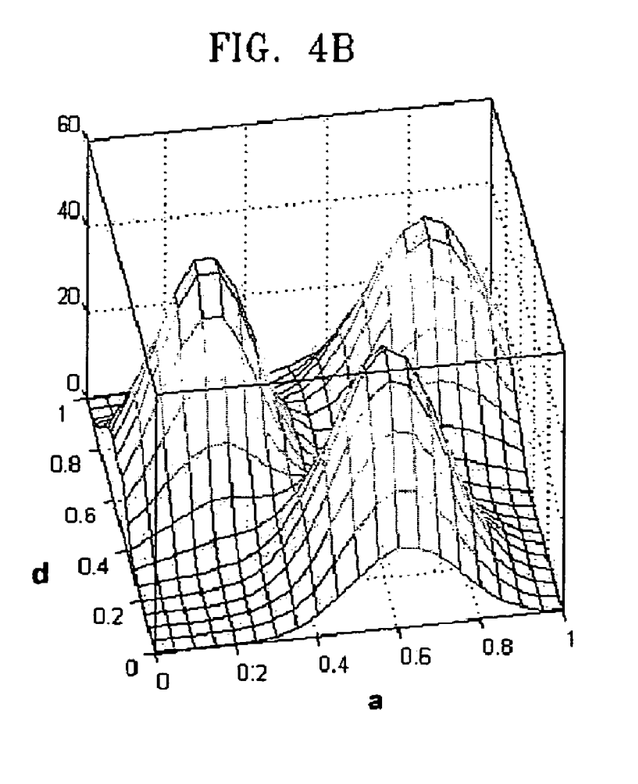

FIGS. 4a and 4b are graphs respectively showing 2-dimensional and 3-dimensional results of clusters obtained by the source identification unit 13, respectively. Here, since three clusters are generated, three sources exist.

If the center of each cluster for the present frame is estimated using moving averages, tracking the target sources is possible when the target sources are slowly moving. An initial guess of the cluster centers for the next frame is the cluster centers obtained in the current frame, thereby capable of speeding up the convergence of the clustering algorithm.

Alternately, a hard K-means clustering algorithm, as another possibility of clustering P mixing parameters, can be used. In the hard K-means clustering algorithm, the responsibility $r_j^{(k)}$ is represented as 0 or 1. As a result, since a process of computing the exponential function for all data points is unnecessary, the computational burden is reduced. However, in this case, the responsibility $r_j^{(k)}$ is assigned to a value proportional to the magnitude of the spectral component necessary to compute the data point $\mu_j$ only when the cluster means are calculated after the algorithm has converged. This is because spectral components of large magnitude are less vulnerable to corrupting noise.

Returning to FIG. 1 again, the signal estimation unit 15 compares the global signal absence probability calculated by the signal absence probability calculator 11 with a second threshold value, and determines that only a noise signal exists for a frame in which the global signal absence probability exceeds the second threshold value. Then, the signal estimation unit 15 updates the noise signal power and updates the source signal power for all frames to thereby generate a source signal component without noise signals. This process will be described in more detail with reference to FIG. 5 as follows.

Figure 5:
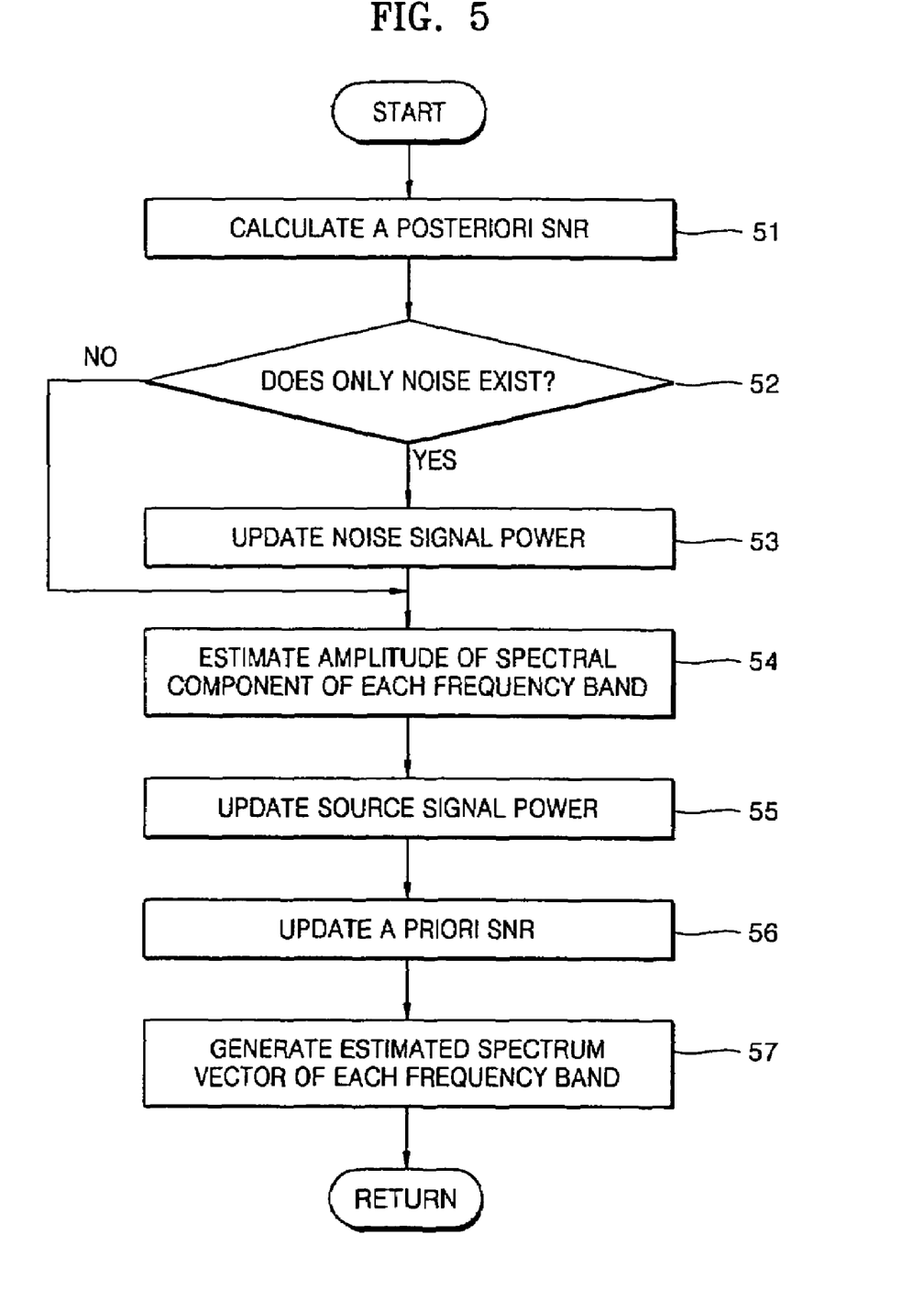
FIG. 5 is a flowchart illustrating an operation of a signal estimation unit of FIG. 1.

Referring to FIG. 5, a posteriori signal-to-noise ratios (SNRs) for the m-th frame are calculated by equation 26, using the first through M-th a priori SNRs for the previous (m−1)-th frame calculated by equation 25.

Next, the global signal absence probability for the m-th frame calculated by the signal absence probability calculator 11 is compared with the second threshold value and it is determined whether only a noise signal exists in the present m-th frame. That is, when the global signal absence probability for the m-th frame exceeds the second threshold value, it is determined that only a noise signal exists.

When it is determined that only a noise signal exists at the m-th frame, the noise signal power $\sigma_{N_k}^2$ is updated according to equation 17.

$$\sigma_{N_k}^2(m) = \zeta_{N_k}\sigma_{N_k}^2(m-1) + (1-\zeta_{N_k})|N_k(m)|_2 \quad (17)$$

In the equation 17, $\zeta_{N_k}$ is a smoothing parameter ($0 \leq \zeta_{N_k} \leq 1$).

Next, spectral component values for each of the frequency bands for the frame in which only the noise signal exists and the noise signal power is updated, or for the frame in which the noise signal and the source signal coexist are estimated. At this time, to eliminate the noise, a Minimum Mean-Square Error (MMSE) estimation algorithm is used.

That is, in a case where the signal absence probability calculator 11 calculates the signal absence probability for the first microphone observation, assuming that $X_k(m)$ denotes the k-th spectral component in m-th frame of the first mixture $x_1(t)$ and $S_k(m)$ and $N_k(m)$ denote the source and noise component therein, equation 18 is satisfied.

$$X_k(m) = S_k(m) + N_k(m)$$

where, $X_k(m) = R_k e^{i\theta_k}$ and $S_k(m) = A_k e^{i\alpha_k}$ \quad (18)

In equation 18, $R_k$ and $A_k$ are the short-time spectral magnitude of the $X_k(m)$ and $S_k(m)$, respectively.

By using the MMSE estimation algorithm, estimating $A_k$ from $X_k$ is possible, because the short-time spectral amplitude rather than its waveform is of major importance in human perception. The constrained complex exponential estimator is found to be a complex exponential of the noisy phase, i.e. $\alpha_k = \theta_k$. This is disclosed in detail in the paper "Speech Enhancement Using a Minimum Mean-square Error Short-time Spectral Amplitude Estimator," by Y. Ephraim and D. Malah, IEEE Trans. Acoust, Speech, Signal Processing, vol. 32, no.6, pp.1109-1121, 1984, the disclosure of which is incorporated by reference.

Since the spectral component values in the respective frequency bands are assumed to be statistically independent, the MMSE estimator $\hat{A}_k$ of $A_k$ is obtained by equations 19 and 20.

$$\hat{A}_k = E\{A_k \mid X\} \quad (19)$$
$$= E\{A_k \mid X_k\}$$
$$= p(H_{1,k} \mid X_k)E\{A_k \mid X_k, H_{1,k}\}$$
$$= (1 - p(H_{0,k} \mid X_k))E\{A_k \mid X_k, H_{1,k}\}$$
$$= \frac{q_k \Lambda_k}{1 + q_k \Lambda_k} E\{A_k \mid X_k, H_{1,k}\}$$

$$E\{A_k \mid X_k, H_{1,k}\} = \frac{\int_0^\infty \int_0^{2\pi} A_k p(X_k \mid A_k, \alpha_k) d\alpha_k dA_k}{\int_0^\infty \int_0^{2\pi} p(X_k \mid A_k, \alpha_k) d\alpha_k dA_k} \quad (20)$$

where the probability density function $p(X_k|A_k,\alpha_k)$ is given by equation 21.

$$p(X_k \mid A_k, \alpha_k) = \frac{1}{\pi \sigma_{N_k}^2} \exp\left(-\frac{1}{\sigma_{N_k}^2}|X_k - A_k e^{i\alpha_k}|^2\right) \quad (21)$$

Since complex Gaussian probability density is assumed for the probability density function of the signal, the probability density function of its magnitude $p(A_k)$ becomes a Rayleigh distribution, and $p(\alpha_k)$ is independent of $p(A_k)$ and is uniform over $[-\pi,\pi]$. Accordingly, $p(A_k,\alpha_k)$ is expressed by equation 22.

$$p(A_k, \alpha_k) = p(A_k)p(\alpha_k) = \frac{A_k}{\pi \sigma_{S_k}^2} \exp\left(-\frac{A_k^2}{\sigma_{S_k}^2}\right) \quad (22)$$

After some calculations disclosed in the paper "Speech Enhancement Using a Minimum Mean-square Error Short-time Spectral Amplitude Estimator," by Y. Ephraim and D. Malah, IEEE Trans. Acoust, Speech, Signal Processing, vol. 32, no.6, pp.1109-1121, 1984, the disclosure of which is incorporated by reference, the following equation 23 is obtained.

$$\hat{A}_k = \frac{q_k \Lambda_k}{1+q_k \Lambda_k} \cdot \Gamma(1.5)\frac{\sqrt{v_k}}{\gamma_k}\exp\left(-\frac{v_k}{2}\right) \cdot \left[(1+v_k)I_0\left(\frac{v_k}{2}\right) + v_k I_1\left(\frac{v_k}{2}\right)\right]R_k \qquad (23)$$

In the above equation 23, $\Gamma(\cdot)$ is the gamma function with $\Gamma(1.5)=\sqrt{\pi}/2$; $I_0(\cdot)$ and $I_1(\cdot)$ denote the modified Bessel functions of zero and first order, respectively, and $v_k$ is defined by equation 24.

$$v_k = \frac{\xi_k}{1+\xi_k}(\gamma_k + 1) \qquad (24)$$

Here, $\xi_k$ and $\gamma_k$ are defined by equations 25 and 26.

$$\xi_k = \frac{\sigma_{S_k}^2}{\sigma_{N_k}^2} \qquad (25)$$

$$\gamma_k = \frac{R_k^2}{\sigma_{N_k}^2} - 1 \qquad (26)$$

$\xi_k$ and $\gamma_k$ are known as the a priori and a posteriori SNR, respectively. If the a priori SNR is very great, the MMSE short-time spectral amplitude estimator $\hat{A}_k$ converges to the Wiener amplitude estimator as in Equation 27.

$$\hat{A}_k \approx \frac{\xi_k}{1+\xi_k}R_k \qquad (27)$$

Next, the source signal power $\sigma_{S_k}^2$ is updated according to equation 28 using the MMSE amplitude estimator $\hat{A}_k$ for the spectral magnitude $A_k$ of each frequency band.

$$\sigma_{S_k}^2 = |\hat{A}_k|^2 \qquad (28)$$

The real acoustic environment is continuously changing. To adapt the time-varying nature of source and noise signals, the signal variances are updated for every frame using equations 28 and 17. The a posteriori SNR $\gamma_k$ of equation 26 can be easily updated using such an updated noise signal power $\sigma_{N_k}^2$.

For abruptly changing source signals, the a priori SNR is updated using equation 29.

$$\xi_k(m) = \zeta_{SNR}\frac{\hat{A}_k^2(m-1)}{\sigma_{N_k}^2(m-1)} + (1-\zeta_{SNR})P(\gamma_k(m)) \qquad (29)$$

In the above equation 29, $\zeta_{SNR}$ is a smoothing parameter ($0 \leq \zeta_{SNR} \leq 1$), $\hat{A}_k(m-1)$ is an amplitude estimator of the k-th spectral component at the (m−1)-th frame, and $P(\cdot)$ is an operator which is defined by equation 30.

$$P(x) = \begin{cases} x & \text{if } x \geq 0 \\ 0 & \text{otherwise} \end{cases} \qquad (30)$$

$P(\cdot)$ is used to ensure the positiveness of the proposed estimator $\hat{A}_k$ in case $\gamma_k(m)$ is negative. As $\gamma_k$ defined by equation 26 is not necessary positive, the operator P, it is ensured that the a priori SNR is always a non-negative value by using $P(\cdot)$ defined by equation 30. By doing so, the smoothing effect of the a priori SNR is achieved when the a posteriori SNR is fluctuating. If there is an abrupt change in the a posteriori SNR, the a priori SNR can follow it with a one frame delay. This property of the a priori SNR helps it to reduce the musical noise effect. This process is disclosed in detail in the paper "Elimination of the Musical Noise Phenomenon With the Ephraim and Malah Noise Suppressor," by O. Cappé, IEEE Trans. Speech and Audio Pressing, vol 2, pp. 345-349,1994, the disclosure of which is incorporated by reference.

Next, a spectrum vector estimated for each frequency band is generated according to equation 31, using the amplitude estimator for each frequency band.

$$\hat{S}_k(m)=\hat{S}_k^{(j)}(m) \qquad (31)$$

$$\text{where, } \hat{\alpha}_k=\theta_k \qquad (31)$$

Returning to FIG. 1 again, after the signal separator 17 multiplies the source vector of the m-th frame provided from the source identification unit 13 by the spectrum vector estimated for each frequency band of the m-th frame provided by the signal estimation unit 15, the signal separator 17 performs inverse Fourier transform and separates the received signals into source signals of time domain. This process is described in more detail with reference to FIG. 6.

Figure 6:
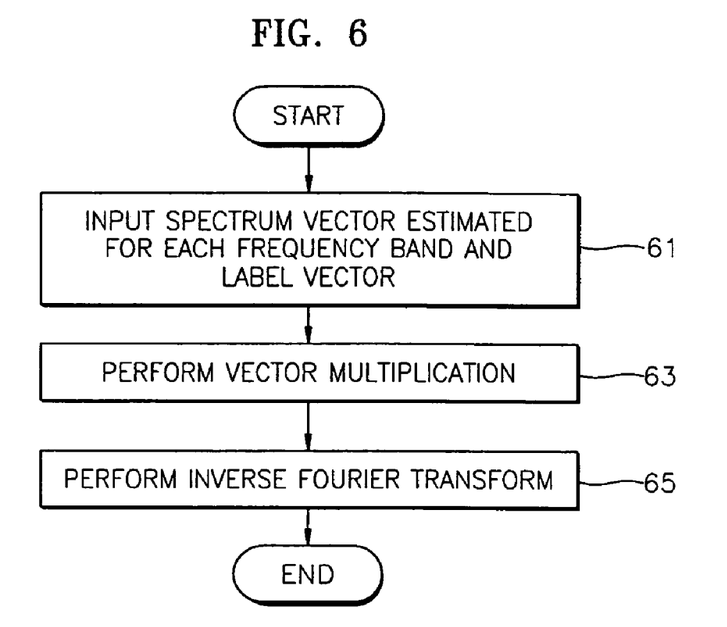
FIG. 6 is a flowchart illustrating an operation of a source separator of FIG. 1.

Referring to FIG. 6, the source label vector expressed by "1" or "0" according to the number of clusters provided by the source identification unit 13 and the index of the frequency band assigned to each cluster, and the spectrum vector estimated for each frequency band of the m-th frame provided by the signal estimation unit 15, are received.

The source label vector and the estimated spectrum vector received are multiplied to each other and signals separated according to sources are obtained.

Thereafter, an inverse Fourier transform is performed for the signals separated according to the sources to transform the signals into signals of time domain.

Source signal separation using the spectrum vector estimated for each frequency band of the m-th frame provided by the signal estimation unit 15, is done with appropriate pairing of k and $S_k(m)$. On the basis of equation 4, the k-th spectral component of the signal estimate at the m-th frame is rewritten as equation 32.

$$\hat{S}_k(m)=\hat{S}_k^{(1)}(m)+ \ldots +\hat{S}_k^{(N)}(m) \qquad (32)$$

Also, the above equation 32 is simplified in equation 33 on the basis of the w-disjoint orthogonality.

$$\hat{S}_k(m)=\hat{S}_{(k)}^{(j)}(m) \qquad (33)$$

To separate the sources, source label vectors corresponding to each of sources are generated. The each source label vector is applied to the estimated spectrum vectors $\hat{S}(m)$ to produce the separated source spectrum. First, a source label vector £$_j(m)$, which maps the relationship between the support of source j and $\hat{S}_k^{(j)}(m)$ is defined. Each component of the source label vector has the value "0" or "1". Then, a spectrum vector $\hat{S}_j(m)$ of the j-th source at the m-th frame can be obtained by equation 34.

$$\hat{S}_j(m)=\text{£}_j(m)\odot\hat{S}(m) \qquad (34)$$

In the above equation 34, ⊙ represents the component-wise multiplication of vectors.

Figure 7:
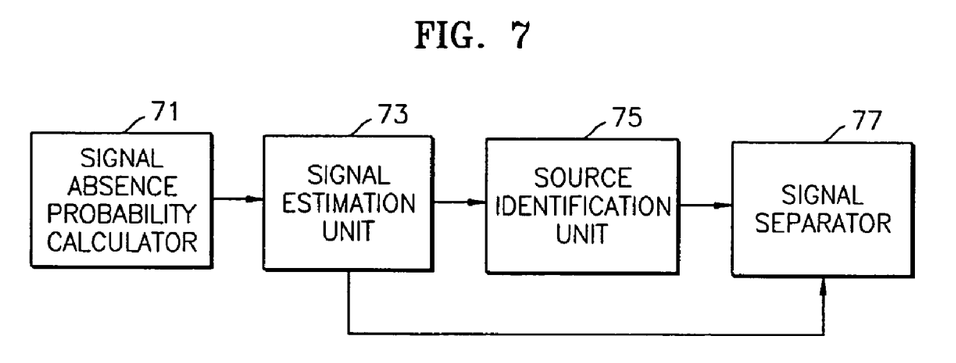
FIG. 7 is a block diagram of a signal separation apparatus according to a second embodiment of the present invention.

FIG. 7 is a block diagram of a signal separation apparatus according to a second embodiment of the present invention, wherein the source separation apparatus comprises a signal absence probability calculator 71, a signal estimation unit 73, a source identification unit 75, and a source signal separator 77.

Referring to FIG. 7, the signal absence probability calculator 71 calculates the global signal absence probabilities p(Ho|X1(m)) and p(Ho|X2(m)) for the m-th frame and the local signal absence probabilities p(Ho,k|X1,k(m)) and p(Ho,k|X2,k(m)) at each of frequency bins of the m-th frame, for the first and second microphone observations X1(m) and X2(m).

The signal estimation unit 73 estimates a spectrum vector in which noise signals are eliminated for each frequency band per frames using the global signal absence probabilities calculated by the signal absence probability calculator 71, for the first and second microphone observations, and generates first and second microphone observations X1(m) and X2(m) without noise signals.

The source identification unit 75 performs clustering using the first and second microphone observations X1(m) and X2(m) without noise signals, as in the above-described first embodiment, and generates a source label vector consisting of a source and a frequency band assigned to each source.

The source signal separator 77 multiplies the source label vector for the m-th frame provided by the source identification unit 75 by the spectrum vector estimated for each frequency band of the m-th frame provided by the signal estimation unit 73, and then performs inverse Fourier transform to thereby separate the received signals into source signals of time domain.

That is, the above-described configuration may be applicable especially in a case where the SNR of the first and second microphone observations X1(m) and X2(m) is large.

To verify the performance of the proposed noisy, under-determined blind source separation algorithm, experiments on speech signals have been performed. Clean speech data were previously recorded at 16 kHz in an anechoic room. 40 words for computer commands and Korean names uttered by four male speakers were used for making the target signals. 40 words pronounced by each speaker were split into 10 files, each file consisting of four words. Thus, 10 sets of target sources were prepared. White Gaussian noise (WGN) was used as a broad-band noise. According to the SNR, WGN was simply added sample by sample after adjusting the signal levels by the method described in the ITU-T recommendation P.830. Source identification and signal estimation were done frame by frame.

Figure 8:
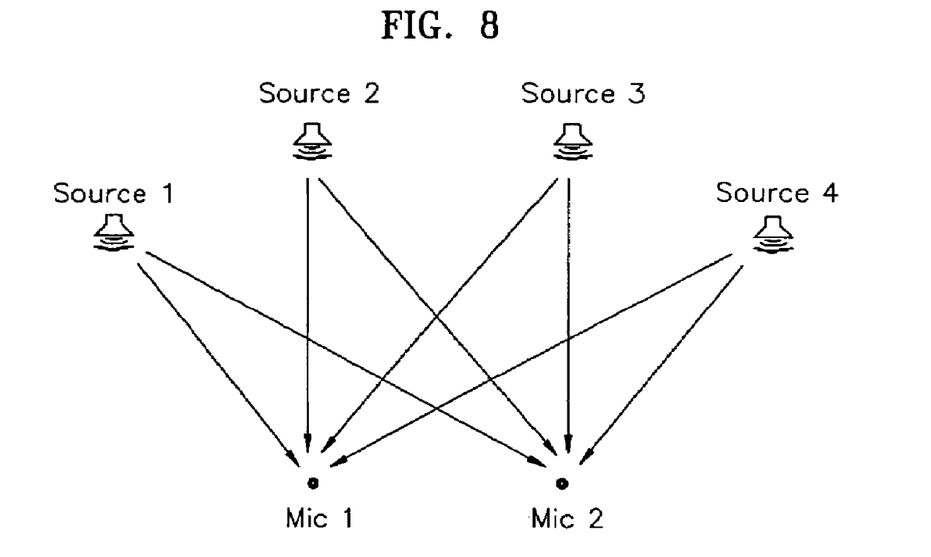
FIG. 8 is a view for describing an experimental environment for estimating a performance of a signal separation algorithm according to the present invention.
Figure 9A:
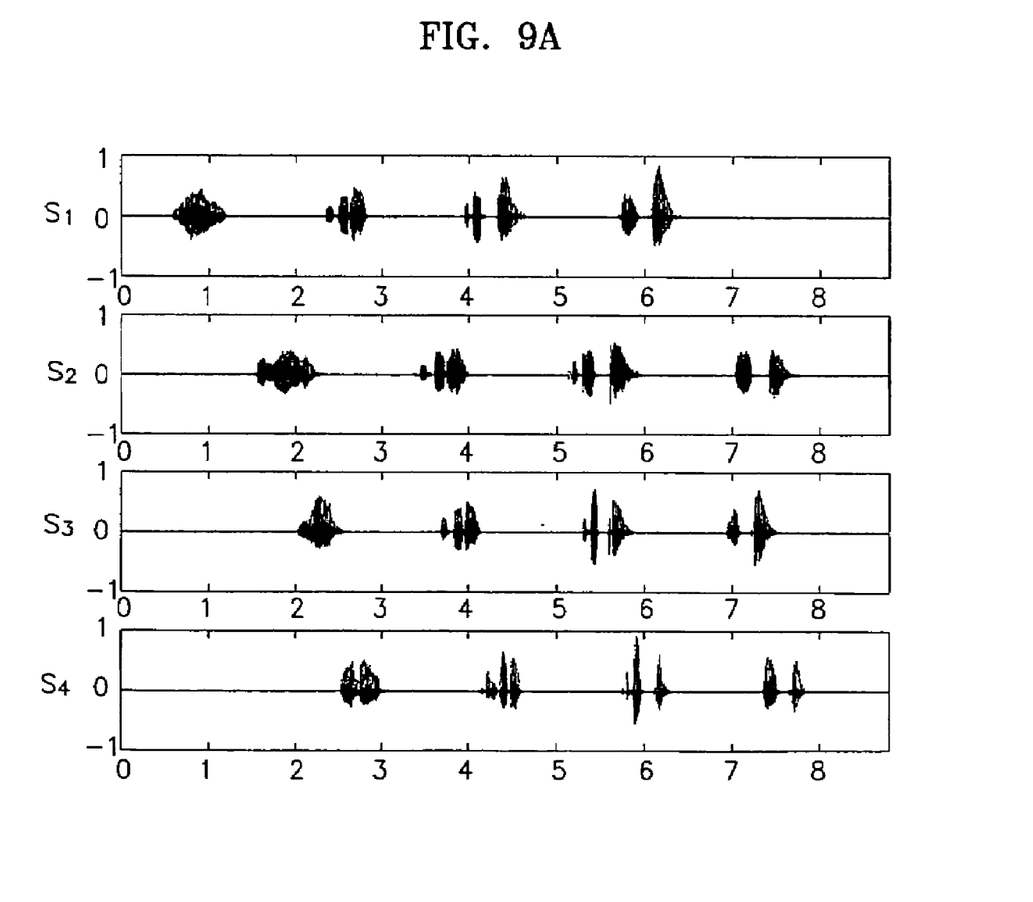
FIGS. 9a through 9c respectively show waveforms of source signals, microphone observations, and separated source signals, which are used for estimating the performance of the signal separation algorithm according to the present invention.
Figure 9B:
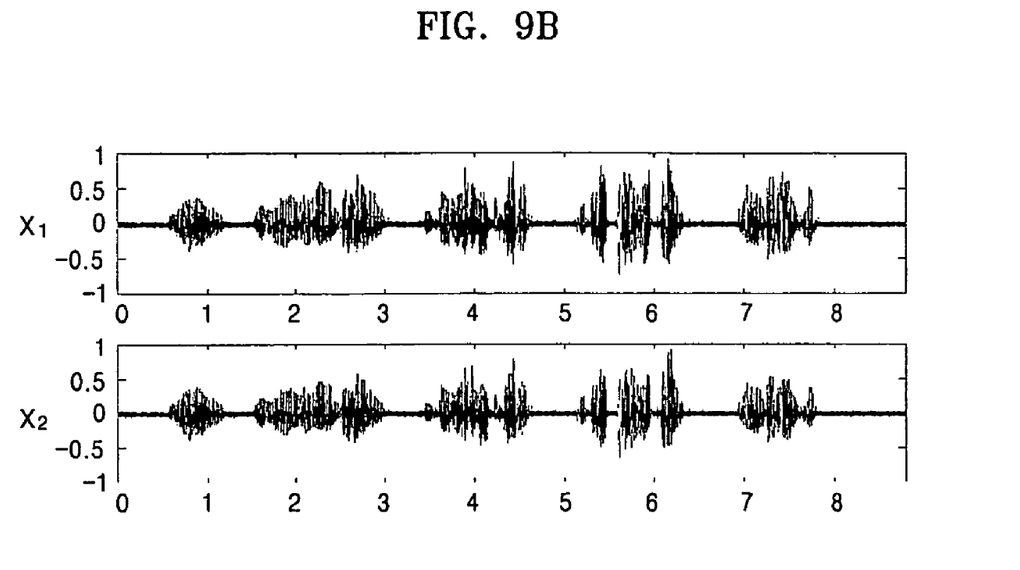
Figure 9C:
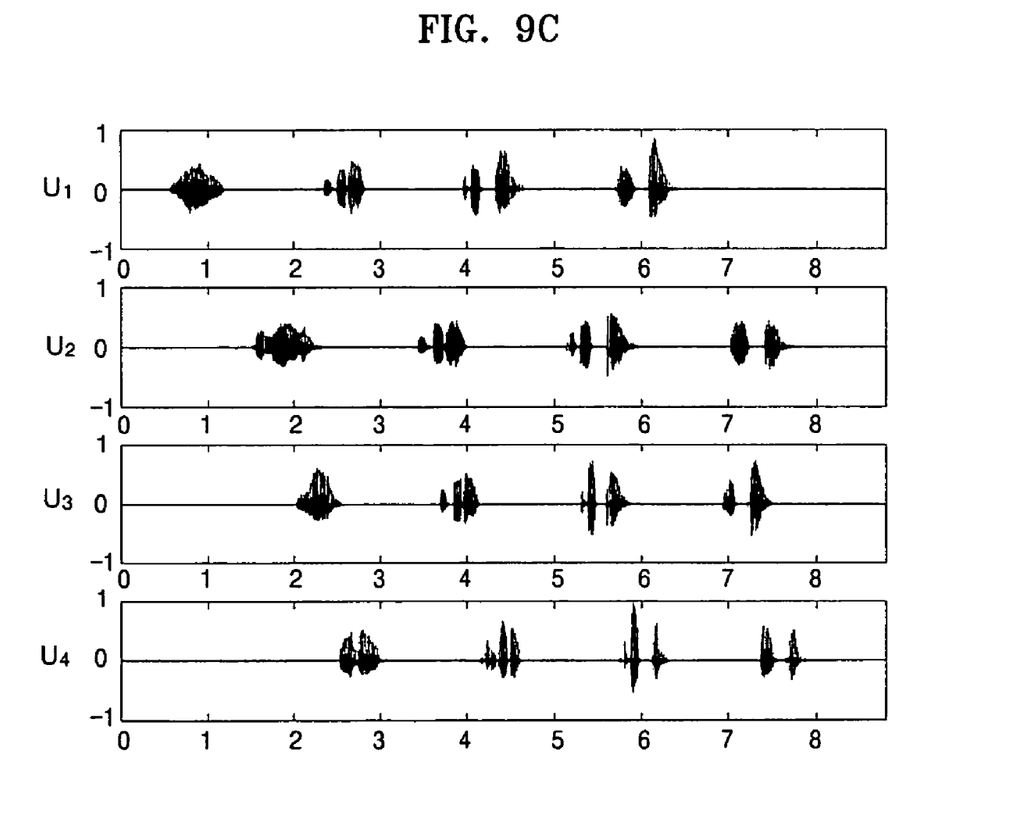

FIG. 8 and FIGS. 9a through 9c are views for describing experimental results of the proposed algorithm according to the present invention. When first and second microphones Mic1 and Mic2 and first through fourth sources Source 1 through Source 4 are used as in FIG. 8, FIG. 9a shows the first through fourth source signals s1 through s4, FIG. 9b shows the first and second microphone observations x1 and x2, and FIG. 9c shows signals u1 through u4 separated according to sources by the source separation algorithm of the present invention. Referring to the above-mentioned drawings, when the source separation algorithm according to the present invention is used, it is possible to significantly reduce noise in real time and correctly separate signals according to sources.

The present invention may be embodied as a program stored on a computer readable medium that can be run on a general computer. Here, the computer readable medium includes but is not limited to storage media such as magnetic storage media (e.g., ROM's, floppy disks, hard disks, etc.), optically readable media (e.g., CD-ROMs, DVDs, etc.), and carrier waves (e.g., transmission over the Internet). The present invention may also be embodied as a computer readable program code unit stored on a computer readable medium, for causing a number of computer systems connected via a network to affect distributed processing.

Also, the source separation method and apparatus according to the present invention is applicable to an environment in which a terminal is kept as distant as possible from a user's device, such as PDA (Personal Digital Assistant), WebPad, or a mobile phone for a vehicle with the smaller number of microphones, as well as an autonomous traveling robot including a microphone array. The present invention can significantly improve the performance of a sound recognizer in such an environment. Also, the present invention is applicable to sound input systems requiring high-quality sound and can be used for a sound source separation system capable of separating respective sound sources in a case where a plurality of sound sources exist in the same environment. Also, the present invention can be used in all fields using conventional sensor arrays, such as a communication field and a radar field.

As described above, according to the present invention, it is possible to separate signals received through two microphones into N source signals while eliminating noise from the received signals in real time. Also, by calculating the signal absence probabilities for the respective frequency bands considering the attenuation and delay parameters, the present invention is applicable even to a case where a white Gaussian noise not satisfying the w-disjoint orthogonality is mixed, thereby improving the tone quality of the restored sound. Also, it is possible to estimate source signals with difficulty in being recognized due to background noise, by using the signal absence probabilities.

Although a few embodiments of the present invention have been shown and described, the present invention is not limited to the described embodiments. Instead, it would be appreciated by those skilled in the art that changes may be made in these embodiments without departing from the principles and spirit of the invention, the scope of which is defined by the claims and their equivalents.

What is claimed is:

1. A method of separating first and second mixture signals received through two sensors into source signals, comprising:

(a) calculating a global signal absence probability for each frame of the mixture signals and a local signal absence probability for each frequency band of a frame for at least one of the first and second mixture signals;

(b) estimating a spectrum vector in which a noise signal is eliminated for each frequency band using the global signal absence probability calculated in the calculating;

(c) determining a plurality of frequency bands including at least one of a noise signal and a source signal using the local signal absence probability, and generating a source label vector which consists of a plurality of frequency bands assigned to each source, using an attenuation parameter and a delay parameter generated for each of the determined frequency bands; and (d) multiplying the spectrum vector estimated for each frequency band obtained in the estimating by the source label vector obtained in the determining, and obtaining signals separated according to the source signals.

2. The method of claim 1, wherein the calculating comprises:
(a1) generating likelihood ratios for each of the frequency bands of a specified frame;
(a2) multiplying the likelihood ratios by a priori probabilities, respectively;
(a3) adding a specified value to the respective multiplied results;
(a4) obtaining reciprocals of the added results, and setting the obtained reciprocals to the local signal absence probabilities of each of the frequency bands, respectively; and
(a5) multiplying all the local signal absence probabilities to obtain global signal absence probabilities of the specified frame.

3. The method of claim 2, wherein the generating is performed according to the following equation:

$$\Lambda_k(m) = \frac{p(X_k(m)|H_{1,k})}{p(X_k(m)|H_{0,k})}$$

and wherein, $$p(X_k(m)|H_{1,k}) = \frac{1}{\pi(\sigma_{S_k}^2(m) + \sigma_{N_k}^2(m))}\exp\left[-\frac{|X_k(m)|^2}{(\sigma_{S_k}^2(m) + \sigma_{N_k}^2(m))}\right]$$

$$p(X_k(m)|H_{0,k}) = \frac{1}{\pi\sigma_{N_k}^2(m)}\exp\left[-\frac{|X_k(m)|^2}{\sigma_{N_k}^2(m)}\right],$$

($\Lambda$ k(m) (where k=1, ..., L/2)) is the likelihood ratio, L represents the number of points in Fourier transform, $p(X_k(m)|H_{1,k})$ is a probability value of the frequency of the frame according to a local signal presence hypothesis $H_{1,k}$, $p(X_k(m)|H_{0,k})$ is a probability value of the frequency of the frame according to a local signal absence hypothesis $H_{0,k}$, and $p(X_k(m)|H_{1,k})$ and $p(X_k(m)|H_{0,k})$ are calculable using a source signal power $\sigma_{S_k}^2$ and a noise signal power $\sigma_{N_k}^2$, respectively.

4. The method of claim 2, wherein an a priori probability $q_k$ is expressable by the following equation:

$$q_k = \frac{p(H_{1,k})}{p(H_{0,k})},$$

p(H1,k) is a probability that noise and source signals will coexist at the frequency, and p(H0,k) is a probability that only noise will exist at the frequency.

5. The method of claim 2, wherein the specified value is 1.

6. The method of claim 2, wherein the obtaining reciprocals is performed according to the following equation:

$$p(H_{0,k}|X_k(m)) = \frac{1}{1 + q_k\Lambda_k(m)}$$

and p(Ho,k|Xk(m)) represents a local signal absence probability for a L/2 frequency of the frame.

7. The method of claim 2, wherein the multiplying is performed according to the following equation:

$$p(H_0|X(m)) = \frac{p(H_0, X(m))}{p(X(m))}$$

$$= \frac{1}{\prod_{k=1}^{M}[1 + q_k\Lambda_k(m)]},$$

$p(H_{o,k}|X_k(m))$ are the L/2 local signal absence probabilities, and $p(H_0|X(m))$ is the global signal absence probability.

8. The method of claim 1, wherein the estimating a spectrum vector comprises:
(b1) updating a noise signal power for each frequency band of a frame in which it is determined that only a noise signal is included by the global signal absence probability calculated in the calculating;
(b2) estimating an amplitude of a spectral component of each frequency band for one of a frame including both of a source signal and a noise signal, determined by the global signal absence probability calculated in the calculating, and a frame in which the noise signal power is updated in the updating; and
(b3) updating a source signal power for each frequency band using the amplitude of the spectral component of each frequency band estimated in the estimating an amplitude.

9. The method of claim 8, wherein the amplitude of the spectral component of each frequency band is estimated using a minimum mean-square error estimation algorithm.

10. The method of claim 8, wherein the noise signal power $\sigma_{N_k}^2$ is updated according to the following equation:

$$\sigma_{N_k}^2(m) = \zeta_{N_k}\sigma_{N_k}^2(m-1) + (1-\zeta_{N_k})|N_k(m)|^2$$

and $\zeta_{N_k}$ is a smoothing parameter ($0 \leq \zeta_{N_k} \leq 1$).

11. The method of claim 8, wherein the estimating is performed according to the following equation:

$$\hat{A}_k \approx \frac{\xi_k}{1+\xi_k}R_k,$$

and wherein $$\xi_k = \frac{\sigma_{S_k}^2}{\sigma_{N_k}^2}, \gamma_k = \frac{R_k^2}{\sigma_{N_k}^2} - 1,$$

and $R_k$ is the short-time spectral magnitude.

12. The method of claim 9, wherein the source signal power $\sigma_{S_k}^2$, is updated according to the following equation $$\sigma_{S_k}^2 = |\hat{A}_k|^2.$$

13. The method of claim 1, wherein the determining comprises:
(c1) comparing the local signal absence probability for each frequency band calculated in the calculating with a first threshold value, and identifying a frequency band in which a signal exists;
(c2) generating the attenuation parameter and the delay parameter from a ratio of the first mixture signal to the second mixture signal for the frequency band identified in the comparing;

(c3) clustering a mixing parameter consisting of the attenuation parameter and the delay parameter generated in the generating; and (c4) generating the source label vector which consists of a source and a plurality of frequency bands assigned to the source, using a mixing parameter belonging to each cluster clustered in the clustering.

14. The method of claim 13, wherein clustering the mixing parameter is performed by one of a soft K-means clustering algorithm and a hard K-means clustering algorithm.

15. The method of claim 13, wherein the comparing is performed for a signal whose signal absence probability is calculated in the calculating, of the first and second sensor mixture signals transformed into frequency domain.

16. The method of claim 13, wherein the comparing is performed for the first and second mixture signals in which a noise signal is eliminated in the estimating a spectrum vector.

17. The method of claim 13, wherein the frequency band in which the signal exists satisfies the following equation for an arbitrary source j:

$$\begin{bmatrix} X_{1,k}(m) \\ X_{2,k}(m) \end{bmatrix} \approx \begin{bmatrix} 1 \\ a_j e^{-i\omega d_j} \end{bmatrix} S_k^{(j)}(m),$$

$\omega = 2\pi k/L$, and L is the number of Fourier transform points.

18. The method of claim 13, wherein the attenuation and delay parameters are generated by analyzing a ratio of $X_{1,k}(m)$ and $X_{2,k}(m)$.

19. The method of claim 18, wherein the attenuation and delay parameters are expressable by the following equation in which $\mu^{(k)}$ is a mixing parameter:

$$\mu^{(k)} = (a(k, m), d(k, m))$$
$$= \left( \left| \frac{X_{2,k}(m)}{X_{1,k}(m)} \right|, -\frac{1}{\omega} \angle \frac{X_{2,k}(m)}{X_{1,k}(m)} \right).$$

20. A computer readable storage medium encoded with processing instructions for causing a processor to perform a method of separating first and second mixture signals received through two sensors into source signals, comprising:

(a) calculating a global signal absence probability for each frame of the mixture signals and a local signal absence probability for each frequency band of a frame for at least one of the first and second mixture signals;

(b) estimating a spectrum vector in which a noise signal is eliminated for each frequency band using the global signal absence probability calculated in the calculating;

(c) determining a plurality of frequency bands including at least one of a noise signal and a source signal using the local signal absence probability, and generating a source label vector which consists of a plurality of frequency bands assigned to each source, using an attenuation parameter and a delay parameter generated for each of the determined frequency bands; and (d) multiplying the spectrum vector estimated for each frequency band obtained in the estimating by the source label vector obtained in the determining, and obtaining signals separated according to the source signals.

21. An apparatus for separating first and second mixture signals received through two sensors into source signals, comprising:

a signal absence probability calculator, which calculates a global signal absence probability for each frame of the mixture signals and a local signal absence probability for each frequency band of a frame for at least one of the first and second mixture signals;

a signal estimation unit, which estimates a spectrum vector for each frequency band in which a noise signal is eliminated using the global signal absence probability calculated by the signal absence probability calculator;

a source signal identification unit, which determines a plurality of frequency bands including at least one of a noise signal and a source signal using the local signal absence probability calculated by the signal absence probability calculator, and generates a source label vector which consists of a plurality of frequency bands assigned to each source signal, using an attenuation parameter and a delay parameter generated for each of the determined frequency bands; and a signal separator, which multiplies the spectrum vector estimated for each frequency band obtained by the signal estimation unit by the source label vector generated by the source identification unit, and obtains signals separated according to the source signal.

22. The apparatus of claim 21, wherein the source identification unit clusters a mixing parameter for each frequency band using a soft K-means clustering algorithm, the mixing parameter consisting of the attenuation parameter and the delay parameter, and generates the source label vector which consists of a source and a plurality of frequency bands assigned to the source, using a mixing parameter belonging to each cluster created to yield a clustered result.

23. The apparatus of claim 21, wherein the source identification unit clusters a mixing parameter according to the sources using a hard K-mean clustering algorithm, the mixing parameter consisting of the attenuation parameter and the delay parameter, and generates the source label vector which consists of a source signal and a plurality of frequency bands assigned to the source signal, using a mixing parameter belonging to each cluster created to yield a clustered result.

24. The apparatus of claim 21, wherein the signal estimation unit estimates an amplitude for a spectrum of each frequency band, using a minimum mean-square error estimation algorithm.

25. The apparatus of claim 24, wherein the signal estimation unit updates a source signal power per frames, for a frame whose noise signal power is updated and in which only a noise signal exists and for a frame in which a noise signal and a source signal coexist, using the global signal absence probability.

26. The apparatus of claim 21, wherein, when a signal-to-noise ratio of the first and second mixture signals is large, the source signal identification unit calculates the attenuation parameter and the delay parameter using the first and second mixture signals whose noise is eliminated by the signal estimation unit.

27. A method of separating first and second mixture signals received through two sensors into source signals, comprising:

(a) calculating a global signal absence probability for each frame of the mixture signals and a local signal absence probability for each frequency band of the frame for at least one of the first and second mixture signals;

(b) estimating a spectrum vector in which a noise signal is eliminated for each frequency band using the global signal absence probability calculated in the calculating, and generating first and second mixture signals without noise signals;

(c) performing clustering using the first and second mixture signals without noise, and generating a source label vector consisting of a source and a frequency band assigned to each source; and (d) multiplying the source label vector obtained by the source identifying by the spectrum vector obtained by the estimating for each frequency band of the frame, and performing an inverse Fourier transform to separate the received signals into source signals of time domain.

28. A method of separating first and second mixture signals received through two microphones into source signals while eliminating noise from the received mixture signals, comprising:

(a) calculating a global signal absence probability for each frame of the mixture signals and a local signal absence probability for each frequency band of a frame for at least one of the first and second mixture signals;

(b) estimating a spectrum vector in which a noise signal is eliminated for each frequency band using the global signal absence probability calculated in the calculating;

(c) determining a plurality of frequency bands including at least one of a noise signal and a source signal using the local signal absence probability, and generating a source label vector which consists of a plurality of frequency bands assigned to each source, using an attenuation parameter and a delay parameter generated for each of the determined frequency bands; and (d) multiplying the spectrum vector estimated for each frequency band obtained in the estimating by the source label vector obtained in the determining, and obtaining signals separated according to the source signals.

* * * * *